UNITED STATES PATENT OFFICE.

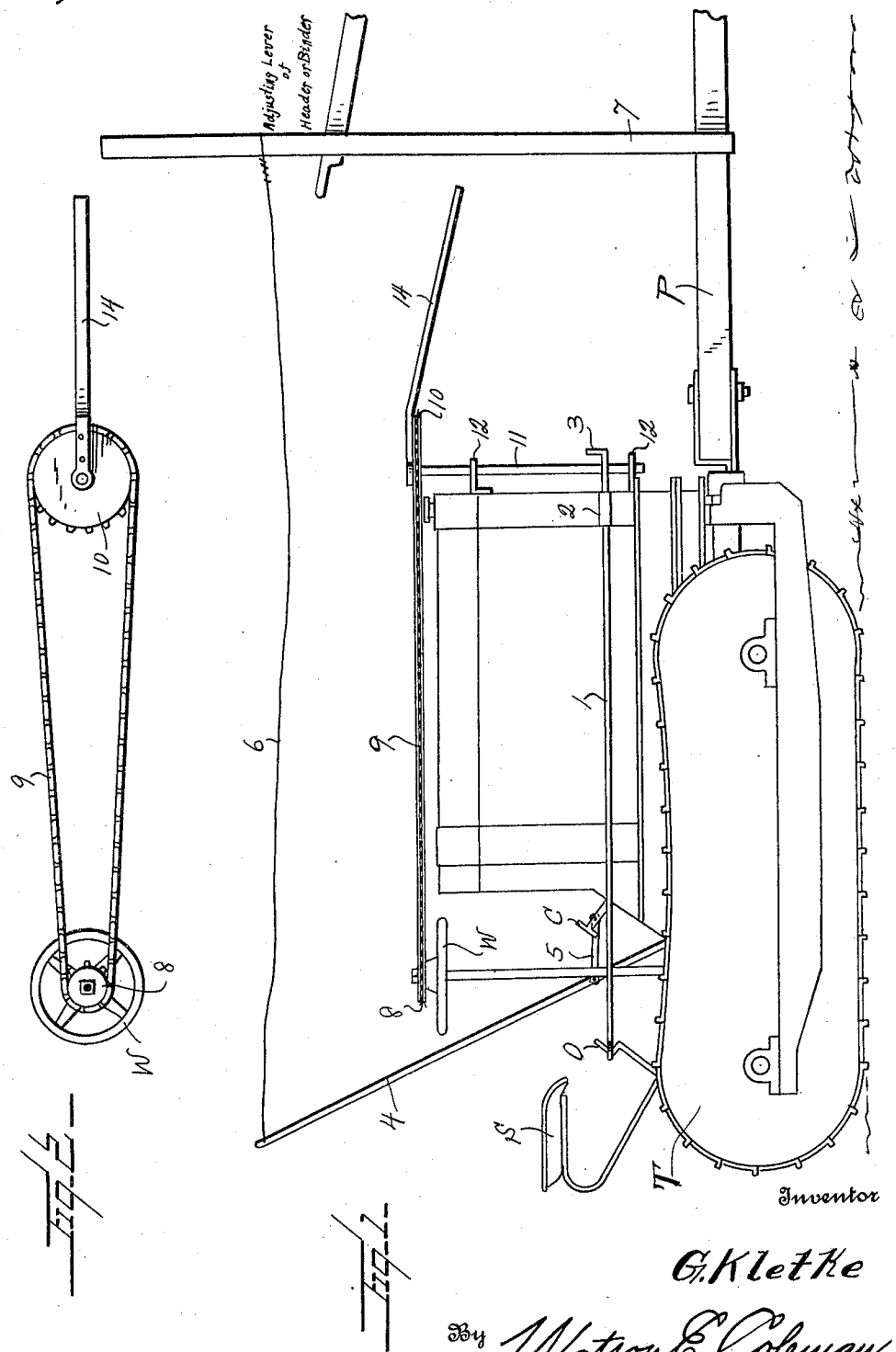

GOTTLIEB KLETKE, OF ALVA, OKLAHOMA.

TRACTOR.

1,412,944. Specification of Letters Patent. Patented Apr. 18, 1922.

Application filed December 3, 1920. Serial No. 429,213.

*To all whom it may concern:*

Be it known that I, GOTTLIEB KLETKE, a citizen of the United States, residing at Alva, in the county of Woods and State of Oklahoma, have invented certain new and useful Improvements in Tractors, of which the following is a specification, reference being had to the accompanying drawings.

This invention relates to certain improvements in tractors, and it is an object of the invention to provide a device of this general character with novel and improved means whereby the desired control of the tractor may be effected by an operator at a point remote from the seat.

It is also an object of the invention to provide a device of this general character with novel and improved means whereby the tractor may be controlled by a person occupying a header or other portable body with which the tractor is employed.

An additional object of the invention is to provide novel and improved means whereby a tractor may be readily and conveniently steered by a person straddling an operating member.

Furthermore, it is an object of the invention to provide a device of this general character with novel and improved means whereby the clutch and throttle of the tractor may be readily operated as desired by a person remote from the seat.

The invention consists in the details of construction and in the combination and arrangement of the several parts of my improved tractor whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a tractor constructed in accordance with an embodiment of my invention and operatively engaged with a header, the header being fragmentarily indicated, and Figure 2 is a view in top plan illustrating in detail the steering mechanism as herein disclosed.

As disclosed in the acompanying drawings, T denotes a tractor of a conventional type and which embodies a steering wheel W positioned to be readily operated by an occupant of the seat S. C denotes a clutch pedal also positioned for convenient manipulation by the occupant of the seat S and O denotes an operating member for the throttle of the engine which is preferably of an internal combustion type.

When a tractor is employed in connection with a header or kindred agricultural machine, it is now generally required that there be a person to occupy the seat structure S to control the engine and a second person to occupy the platform P to properly control or operate the binder. It is the purpose of the present invention to provide a tractor with novel and improved means whereby the binder or the like and the tractor may be readily controlled by a single person occupying the platform P.

Operatively engaged with the operating member O of the throttle of the engine of the tractor is a longitudinally disposed and forwardly directed rod 1 passing through a suitable guide 2 so that the same may readily have endwise movement. The forward end portion of said rod terminates in a hand grasp 3 so that the occupant of the platform P may readily move the rod 1 to properly and effectively operate the throttle of the engine.

Supported by the tractor T for swinging movement is an upstanding elongated lever 4 operatively engaged, as at 5, with the clutch pedal C so that upon movement of the lever 4 in one direction, as forwardly, the pedal C may be caused to move as desired. The upper end portion of the lever 4 has suitably secured thereto a flexible member 6, preferably rope, which extends forwardly and is suitably secured to the upstanding post or pillar 7 carried by the binder or the like. The requisite movement of the lever 4 in one direction may be readily accomplished by the occupant of the platform P imposing sufficient pull upon the member or rope 6.

Carried by the steering wheel W for movement therewith is a sprocket wheel 8 around which passes a sprocket chain 9. This chain extends forwardly of the tractor and passes around a sprocket wheel 10 carried by the upper end portion of a vertically disposed shaft 11. This shaft 11 is supported by the brackets 12 or the like extending forwardly from the radiator or front end of the tractor.

Secured to the upper end portion of the shaft 11 and also to the sprocket wheel 10 is a forwardly directed elongated bar 14. This bar 14 is of a length to overlie the platform P and has its free end portion preferably disposed on a downward incline. The person standing on the platform P straddles the rod 14 and when it is desired to change the direction of travel of the tractor, it is only necessary for the operator to move either to the right or the left as the occasions of practice may require.

From the foregoing description it is thought to be obvious that a tractor constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

The combination with a tractor, of an agricultural implement connected therewith, a platform on the implement, means connected with the throttle and clutch controls of the tractor and extending adjacent the platform, and means for steering the tractor from the platform comprising a sprocket secured upon the steering wheel of the tractor, a vertical shaft journaled at the end of the tractor adjacent the implement, a sprocket on said shaft, a chain trained about said sprockets, and a bar secured to said second named sprocket and extending over said platform to serve as a handle.

In testimony whereof I hereunto affix my signature.

GOTTLIEB KLETKE.